(12) United States Patent
Badia et al.

(10) Patent No.: US 11,714,990 B2
(45) Date of Patent: Aug. 1, 2023

(54) JOINTLY LEARNING EXPLORATORY AND NON-EXPLORATORY ACTION SELECTION POLICIES

(71) Applicant: DeepMind Technologies Limited, London (GB)

(72) Inventors: Adrià Puigdomènech Badia, London (GB); Pablo Sprechmann, London (GB); Alex Vitvitskyi, St Albans (GB); Zhaohan Guo, London (GB); Bilal Piot, London (GB); Steven James Kapturowski, St. Albans (GB); Olivier Tieleman, London (GB); Charles Blundell, London (GB)

(73) Assignee: DeepMind Technologies Limited, London (GB)

( * ) Notice: Subject to any disclaimer, the term of this patent is extended or adjusted under 35 U.S.C. 154(b) by 569 days.

(21) Appl. No.: 16/881,180

(22) Filed: May 22, 2020

(65) Prior Publication Data

US 2020/0372366 A1 Nov. 26, 2020

Related U.S. Application Data

(60) Provisional application No. 62/905,995, filed on Sep. 25, 2019, provisional application No. 62/852,137, filed on May 23, 2019.

(51) Int. Cl.
*G06N 3/08* (2023.01)
*G06N 3/006* (2023.01)
(Continued)

(52) U.S. Cl.
CPC ............. *G06N 3/006* (2013.01); *G06F 18/22* (2023.01); *G06N 3/04* (2013.01); *G06N 3/084* (2013.01); *G06V 10/764* (2022.01); *G06V 10/82* (2022.01)

(58) Field of Classification Search
CPC ........ G06N 3/084; G06N 3/04; G06N 3/0445; G06N 3/006; G06N 3/0454; G06N 3/088; G06V 10/764; G06V 10/82
See application file for complete search history.

(56) References Cited

FOREIGN PATENT DOCUMENTS

WO WO 2018/211140 11/2018
WO WO-2018211140 A1 * 11/2018 ............. G06N 3/006

OTHER PUBLICATIONS

Han et al., "Active Object Detection Using Double DQN and Prioritized Experiences Replay," 2018 International Joint Conference on Neural Networks, IEEE, Jul. 1, 2018, pp. 1-7.
(Continued)

*Primary Examiner* — Jamal Javaid
(74) *Attorney, Agent, or Firm* — Fish & Richardson P.C.

(57) ABSTRACT

Methods, systems, and apparatus, including computer programs encoded on a computer storage medium, for training an action selection neural network that is used to select actions to be performed by an agent interacting with an environment. In one aspect, the method comprises: receiving an observation characterizing a current state of the environment; processing the observation and an exploration importance factor using the action selection neural network to generate an action selection output; selecting an action to be performed by the agent using the action selection output; determining an exploration reward; determining an overall reward based on: (i) the exploration importance factor, and (ii) the exploration reward; and training the action selection neural network using a reinforcement learning technique based on the overall reward.

18 Claims, 5 Drawing Sheets

(51) Int. Cl.

| | |
|---|---|
| G06N 3/04 | (2023.01) |
| G06N 3/084 | (2023.01) |
| G06F 18/22 | (2023.01) |
| G06V 10/764 | (2022.01) |
| G06V 10/82 | (2022.01) |

(56) References Cited

OTHER PUBLICATIONS

Ishii et al., "Control of exploitation-exploration meta-parameter in reinforcement learning," Neural Networks, 2002, 15(4-6): 665-687.
PCT International Search Report and Written Opinion in International Appln. No. PCT/EP2020/064341, dated Aug. 10, 2020, 16 pages.
International Preliminary Report on Patentability in International Appln. No. PCT/EP2020/064341, dated Dec. 2, 2021, 9 pages.
Andrychowicz et al., "Learning Dexterous In-Hand Manipulation," https://arxiv.org/abs/1808.00177v2, Aug. 2018, 27 pages.
Badia et al., "Never Give Up: Learning Directed Exploration Strategies," https://arxiv.org/abs/2002.06038, Feb. 2020, 28 pages.
Barth-Maron et al., "Distributed Distributional Deterministic Policy Gradients," https://arxiv.org/abs/1804.08617, Apr. 2018, 16 pages.
Bellemare et al., "The Arcade Learning Environment: An Evaluation Platform for General Agents," Journal of Artificial Intelligence Research, Jun. 2013, 47: 253-279.
Bellemare et al., "Unifying Count-Based Exploration and Intrinsic Motivation," Advances in Neural Information Processing Systems 29 (NIPS 2016), Dec. 2016, 9 pages.
Beyer et al., "MULEX: Disentangling Exploitation from Exploration in Deep RL," https://arxiv.org/abs/1907.00868, Jul. 2019, 13 pages.
Blundell et al., "Model-Free Episodic Control," https://arxiv.org/abs/1606.04460, Jun. 2016, 12 pages.
Bromley et al., "Signature Verification Using a "Siamese" Time Delay Neural Network," Advances in Neural Information Processing Systems, 1994, 737-744.
Burda et al., "Large-Scale Study of Curiosity-Driven Learning," https://arxiv.org/abs/1808.04355, Aug. 2018, 15 pages.
Burda et al., "Exploration by Random Network Distillation," https://arxiv.org/abs/1810.12894, Oct. 2018, 17 pages.
Choi et al., "Contingency-Aware Exploration in Reinforcement Learning," https://arxiv.org/abs/181L01483v1, Nov. 2018, 14 pages.
Ecoffet et al., "Go-Explore: a New Approach for Hard-Exploration Problems," https://arxiv.org/abs/190L10995v1, Jan. 2019, 37 pages.
Espeholt et al., "IMPALA: Scalable Distributed Deep-RL with Importance Weighted Actor-Learner Architectures," https://arxiv.org/abs/1802.01561v3, last revised Jun. 2018, 22 pages.
François-Lavet et al., "An Introduction to Deep Reinforcement Learning," Now Foundations and Trends in Machine Learning, 2018, 11(3-4):219-354.
github.com [online], "The pycolab game engine," retrieved from URL <https://github.com/deepmind/pycolab/tree/master/pycolab>, 2017, retrieved on May 27, 2020, 1 page.
Haber et al., "Learning to Play With Intrinsically-Motivated, Self-Aware Agents," Advances in Neural Information Processing Systems 31 (NIPS 2018), 2018, 12 pages.
Horgan et al., "Distributed Prioritized Experience Replay," https://arxiv.org/abs/1803.00933, Mar. 2018, 19 pages.
Houthooft et al., "VIME: Variational Information Maximizing Exploration," Advances in Neural Information Processing Systems 29 (NIPS 2016), 2016, 9 pages.
Jaderberg et al., "Population Based Training of Neural Networks," https://arxiv.org/abs/1711.09846v2, Nov. 2017, 21 pages.
Jaderberg et al., "Reinforcement Learning with Unsupervised Auxiliary Tasks," https://arxiv.org/abs/1611.05397, Nov. 2016, 14 pages.
Kakade et al., "Exploration in Metric State Spaces," Proceedings of the 20th International Conference on Machine Learning (ICML-03), 2003, 7 pages.

Kapturowski et al., "Recurrent Experience Replay in Distributed Reinforcement Learning," International Conference on Learning Representations, retrieved from URL <https://openreview.net/pdf?id=rllyTjAqYX>, Sep. 2018, 19 pages.
Kim et al., "Emi: ExEMI: Exploration with Mutual Information Maximizing State and Action Embeddings," https://arxiv.org/abs/1810.01176v1, Oct. 2018, 12 pages.
Koch et al., "Siamese Neural Networks for One-Shot Image Recognition," ICML Deep Learning Workshop, retrieved from URL <https://www.cs.cmu.edu/~rsalakhu/papers/oneshot1.pdl>, 2015, 8 pages.
Mnih et al., "Human-level control through deep reinforcement learning," Nature, Feb. 2015, 518:529-533.
Munos et al., "Safe and Efficient Off-Policy Reinforcement Learning," Advances in Neural Information Processing Systems 29 (NIPS 2016), 2016, 9 pages.
Oh et al., "Action-Conditional Video Prediction using Deep Networks in Atari Games," Advances in Neural Information Processing Systems 28 (NIPS 2015), 9 pages.
Osband et al., "Deep Exploration via Bootstrapped DQN," Advances in Neural Information Processing Systems 29 (NIPS 2016), 2016, 9 pages.
Ostrovski et al., "Count-Based Exploration with Neural Density Models," Proceedings of the 34th International Conference on Machine Learning, Aug. 2017, 10 pages.
Pathak et al., "Curiosity-Driven Exploration by Self-Supervised Prediction," 2017 IEEE Conference on Computer Vision and Pattern Recognition Workshops (CVPRW), Jul. 2017, 488-489.
Pohlen et al., "Observe and Look Further: Achieving Consistent Performance on Atari," https://arxiv.org/abs/1805.11593, May 2018, 19 pages.
Pritzel et al., "Neural Episodic Control," Proceedings of the 34th International Conference on Machine Learning, Aug. 2017, 10 pages.
Savinov et al., "Episodic Curiosity through Reachability," https://arxiv.org/abs/1810.02274v1, Oct. 2018, 16 pages.
Schaul et al., "Prioritized Experience Replay," https://arxiv.org/abs/1511.05952v1, Nov. 2015, 23 pages.
Schaul et al., "Universal Value Function Approximators," Proceedings of the 32nd International Conference on Machine Learning, Jun. 2015, 9 pages.
Schaul et al., "Prioritized Experience Replay," https://arxiv.org/abs/1511.05952v4, last revised Feb. 2016, 21 pages.
Silver et al., "Mastering the game of Go with deep neural networks and tree search," Nature, Jan. 2016, 529:484-489.
Singh et al., "Intrinsically Motivated Reinforcement Learning," Advances in neural information processing systems, 2005, 8 pages.
Stadie et al., "Incentivizing Exploration In Reinforcement Learning With Deep Predictive Models," https://arxiv.org/abs/1507.00814v1, Jul. 2015, 10 pages.
Stanton et al., "Deep Curiosity Search: Intra-Life Exploration Improves Performance on Challenging Deep Reinforcement Learning Problems," https://arxiv.org/abs/1806.00553v1, Jun. 2018, 14 pages.
Strehl et al., "An analysis of model-based Interval Estimation for Markov Decision Processes," Journal of Computer and System Sciences, Dec. 2008, 74(8): 1309-1331.
Sutton, "The Bitter Lesson," retrieved from URL <http://www.incompleteideas.net/IncIdeas/BitterLesson.html>, Mar. 2019, 1 page.
Thrun, "Efficient Exploration In Reinforcement Learning," Technical Report, retrieved from URL <https://www.ri.cmu.edu/pub_files/pub1/thrun_Sebastian_1992_1/thrun_Sebastian_1992_1.pdf>, Jan. 1992, 44 pages.
Wang et al., "Dueling Network Architectures for Deep Reinforcement Learning," https://arxiv.org/abs/1511.06581v1, Nov. 2015, 14 pages.
Warde-Farley et al., "Unsupervised Control Through Non-Parametric Discriminative Rewards," https://arxiv.org/abs/1811.11359, Nov. 2018, 17 pages.

(56) References Cited

OTHER PUBLICATIONS

Xu et al., "Meta-Gradient Reinforcement Learning," Advances in Neural Information Processing Systems 31 (NIPS 2018), 2018, 12 pages.

* cited by examiner

JOINTLY LEARNING EXPLORATORY AND NON-EXPLORATORY ACTION SELECTION POLICIES

CROSS-REFERENCE TO RELATED APPLICATION

This application is claims priority under 35 U.S.C. 119 to Provisional Application Nos. 62/905,995, filed Sep. 25, 2019, and 62/852,137, filed May 23, 2019, both which are incorporated by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations for controlling an agent that is interacting with an environment.

According to a first aspect, there is provided a method performed by one or more data processing apparatus for training an action selection neural network that is used to select actions to be performed by an agent interacting with an environment, the method comprising: receiving an observation characterizing a current state of the environment; selecting an exploration importance factor from a set of possible exploration importance factors; processing the observation and the exploration importance factor using the action selection neural network to generate an action selection output; selecting an action to be performed by the agent using the action selection output; determining an exploration reward based on: (i) a subsequent observation characterizing a state of the environment after the agent performs the selected action and (ii) one or more prior observations characterizing states of the environment prior to the agent performing the selected action; determining an overall reward based on: (i) the exploration importance factor, and (ii) the exploration reward; and training the action selection neural network using a reinforcement learning technique based on the overall reward.

In some implementations, the method further comprises: obtaining a task reward that characterizes a progress of the agent towards accomplishing a task after the agent performs the selected action; wherein determining the overall reward comprises: determining a modified exploration reward based on the exploration importance factor and the exploration reward; and determining the overall reward based on the task reward and the modified exploration reward.

In some implementations, determining the modified exploration reward based on the exploration importance factor and the exploration reward comprises: scaling the exploration reward by the exploration importance factor.

In some implementations, determining the overall reward based on the task reward and the modified exploration reward comprises determining the overall reward as a sum of the task reward and the modified exploration reward.

In some implementations, the set of possible exploration importance factors comprises a baseline exploration importance factor such that determining the overall reward based on the baseline exploration importance factor and the exploration reward results in the overall reward being independent of a value of the exploration reward.

In some implementations, the baseline exploration importance factor has value zero.

In some implementations, the reinforcement learning technique is a Retrace double Q-learning technique with prioritized experience replay.

In some implementations, the set of possible exploration importance factors is a discrete set.

In some implementations, determining the exploration reward comprises: providing the subsequent observation and the prior observations to an embedding neural network, wherein the embedding neural network is configured to process an input observation to generate an embedded representation of the input observation; and determining the exploration reward based on, for each prior observation, a similarity measure between the prior observation and the subsequent observation.

In some implementations, the embedding neural network has been trained to process an input observation to generate an embedded representation of the input observation that characterizes aspects of the state characterized by the input observation that are controllable by the agent.

According to another aspect there is provided a method performed by one or more data processing apparatus for controlling an agent interacting with an environment, the method comprising, at each of a plurality of time steps: receiving an observation characterizing a current state of the environment; processing the observation and an exploration factor using an action selection neural network to generate an action selection output, wherein the action selection neural network has been trained using the previously described method, wherein the exploration factor has value zero; and selecting an action to be performed by the agent at the time step using the action selection output.

In some implementations, the agent is a robotic agent interacting with a real-world environment.

In some implementations, the observation characterizing the current state of the environment comprises an image.

According to another aspect, there is provided a system comprising one or more computers and one or more storage devices storing instructions that when executed by the one or more computers cause the one or more computers to perform the operations of the previously described methods.

According to another aspect, there are provided one or more non-transitory computer storage media storing instructions that when executed by one or more computers cause the one or more computers to perform the operations of the previously described methods.

According to another aspect there is provided a system for selecting actions to be performed by an agent that interacts with an environment by performing actions from a predetermined set of actions, the system comprising: an action selection subsystem that is configured to, at each of a plurality of time steps: process a current observation characterizing a current state of the environment using an action selection neural network to generate an action selection output; and select an action from the predetermined set of actions to be performed by the agent using the action selection output; an external memory that stores embedded controllability representations of previous observations characterizing previous states of the environment; a reward subsystem that is configured to, at each of a plurality of time steps: process a current observation characterizing a current state of the environment using an embedding neural network to generate an embedded controllability representation of the current observation; and generate an exploration reward based on, for each of a plurality of embedded controllability representations from the external memory, a respective similarity measure between the embedded controllability representation of the current observation and the embedded controllability representation from the external memory; and a training subsystem that is configured to: train the action selection neural network based on the exploration rewards generated by the reward subsystem using reinforcement learning techniques; and train the embedding neural network to process an input observation to generate an embedded controllability representation of the input observation that characterizes aspects of the state characterized by the input observation that are controllable by the agent.

In some implementations, training the embedding neural network comprises jointly training the embedding neural network with an action prediction neural network, wherein the action prediction neural network is configured to generate a prediction for an action that caused the state of the environment to transition from a state characterized by a given observation at a given time step to a state characterized by a subsequent observation at a subsequent time step by processing respective embedded controllability representations of the given observation and the subsequent observation that are generated using the embedding neural network.

In some implementations, training the embedding neural network comprises jointly training the embedding neural network with a state prediction neural network, wherein the state prediction neural network is configured to process an input comprising: (i) an embedded controllability representation of a given observation that is generated using the embedding neural network and that characterizes the state of the environment at a given time step, and (ii) a representation of an action performed by the agent at the given time step, to generate an output characterizing a predicted subsequent state of the environment at a subsequent time step that follows the given time step.

In some implementations, generating the exploration reward comprises: identifying a predetermined number of embedded controllability representations from the external memory having the highest similarity measures with the embedded controllability representation of the current observation; determining a combined similarity measure based on the similarity measures between the embedded controllability representation of the current observation and each of the identified embedded controllability representations from the external memory; and determining the exploration reward based on an inverse of the combined similarity measure.

In some implementations, the system further comprises a memory management subsystem that is configured to, at each of a plurality of time steps: determine that a memory resetting criterion is satisfied; and in response to determining that the memory resetting criterion is satisfied, erase the embedded controllability representations stored in the external memory as of the time step.

In some implementations, determining that a memory resetting criterion is satisfied comprises determining that the memory resetting criterion was last satisfied a predetermined number of time steps before the current time step.

In some implementations, the reward subsystem is further configured to, at each of the plurality of time steps: determine a non-episodic exploration reward that depends on every previous state of the environment during interaction of the agent with the environment; and update the exploration reward based on the non-episodic exploration reward.

In some implementations, the non-episodic exploration reward comprises a random network distillation (RND) reward.

In some implementations, updating the exploration reward based on the non-episodic exploration reward comprises: clipping the non-episodic exploration reward to a predetermined range; and multiplying the exploration reward by the clipped non-episodic exploration reward.

In some implementations, the training subsystem is further configured to train the action selection neural network based on external rewards that are provided to the training subsystem.

In some implementations, the action selection neural network is a Q neural network and the action selection output comprises a respective Q value for each action in the predetermined set of actions.

In some implementations, selecting an action comprises determining an action with a highest Q value.

In some implementations, selecting an action comprises selecting the action in accordance with an exploration policy.

According to another aspect there is provided a method performed by one or more data processing apparatus that performs the operations of the previously described system.

According to another aspect there are provided one or more non-transitory computer storage media storing instructions that when executed by one or more computers cause the one or more computers to perform the operations of the previously described system.

Particular embodiments of the subject matter described in this specification can be implemented so as to realize one or more of the following advantages.

The system described in this specification can train an action selection neural network (having a plurality of weights which are modified during the training) to jointly learn a family of action selection policies indexed by an exploration importance factor. The value of the exploration importance factor corresponding to an action selection policy may characterize the degree to which the action selection policy is "exploratory", i.e., selects actions that cause the agent to explore the environment. The system can use the information provided by the exploratory policies to learn a more effective "exploitative" action selection policy, i.e., that selects actions to maximize a cumulative measure of "task" rewards received by the agent rather than causing the agent to explore the environment. A task reward received by the agent may characterize a progress of the agent towards accomplishing a task. The information provided by the exploratory policies may include, e.g., information stored in the shared weights of the action selection neural network. Learning the exploratory policies enables the system to continually train the action selection neural network even if the task rewards are sparse, e.g., rarely non-zero.

After training, the action selection neural network can select actions using the exploitative action selection policy (e.g., corresponding to the exploration importance factor being zero), thereby enabling the agent to exploit the learned knowledge of the environment to effectively perform tasks. Compared to conventional systems, the system described in this specification may consume fewer computational resources (e.g., memory and computing power) by training the action selection neural network to achieve an acceptable level of performance over fewer training iterations. Moreover, an action selection neural network trained by the system described in this specification may select actions that enable the agent to accomplish tasks more effectively (e.g., more quickly) than an action selection neural network trained by an alternative system.

To encourage exploration, the system described in this specification may provide the agent with an "exploration" reward at each time that characterizes the progress of the agent in exploring the environment. To generate the exploration reward at a time step, the system determines the novelty of the current state of the environment by comparing an embedded "controllability" representation of a current observation of the environment to embedded controllability representations of previous observations of the environment. The system generates embedded controllability representations that characterize aspects of the state of the environment that are controllable by the agent, i.e., that are at least partially determined by the actions performed by the agent. Training the action selection neural network using exploration rewards based on embeddings that characterize controllable aspects of the state of the environment can enable the agent to more effectively explore environments with complex state spaces and inherent randomness, e.g., real-world environments with distractor objects and variations in lighting.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
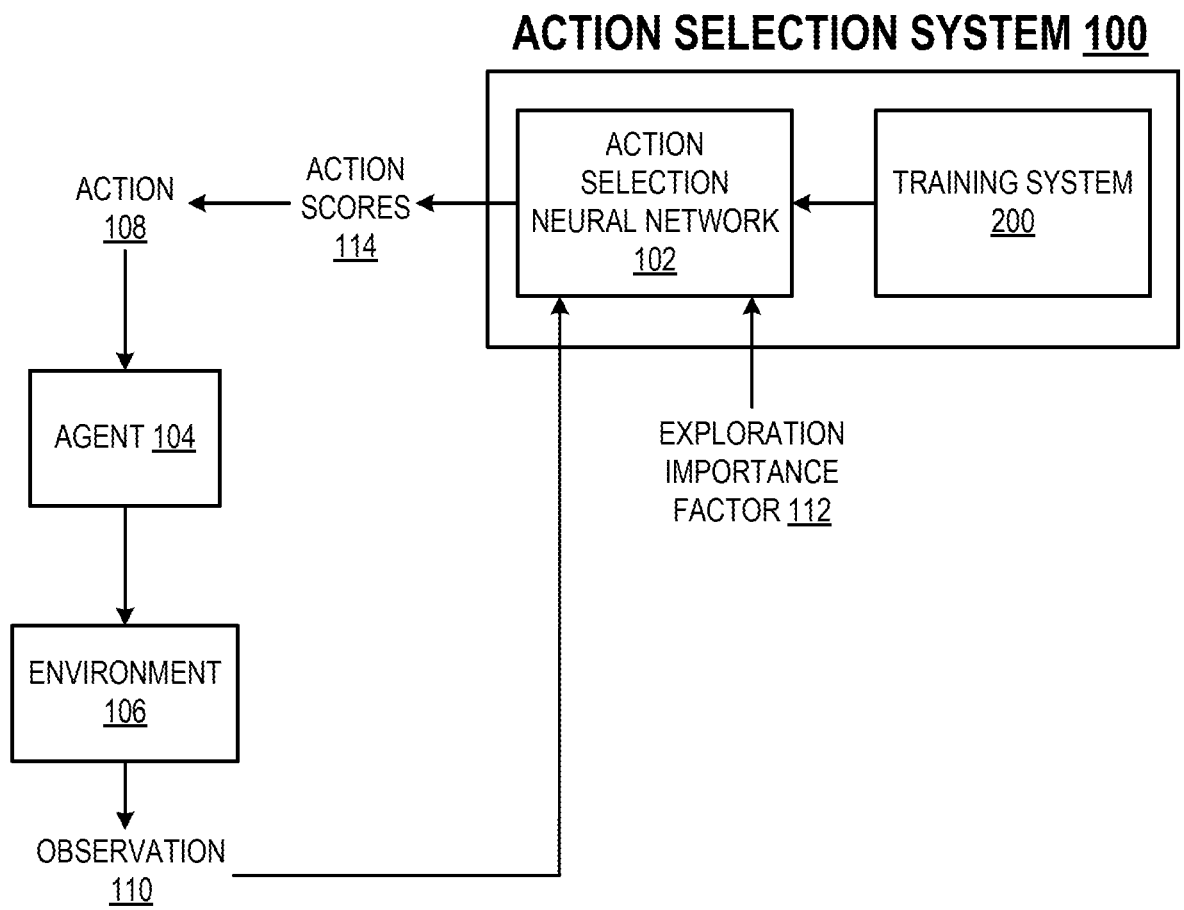
FIG. 1 shows an example action selection system.

FIG. 1 shows an example action selection system 100. The action selection system 100 is an example of a system implemented as computer programs on one or more computers in one or more locations in which the systems, components, and techniques described below are implemented.

The action selection system 100 uses an action selection neural network 102 to control an agent 104 interacting with an environment 106 to accomplish a task by selecting actions 108 to be performed by the agent 104 at each of multiple time steps. At each time step, the action selection neural network 102 is configured to process an input including: (i) an observation 110 characterizing the current state of the environment, and (ii) an exploration importance factor 112 from a set of possible exploration importance factors, to generate action scores 114. The action scores 114 may include a respective numerical value for each action in a set of possible actions and are used by the system 100 to select the action 108 to be performed by the agent 104 at the time step.

The action selection neural network 102 may be understood as implementing a family of action selection policies that are indexed by the possible exploration importance factors. In particular, a training system 200 (which will be described in more detail with reference to FIG. 2) may train the action selection neural network 102 such that the value of the exploration importance factor characterizes the degree to which the corresponding action selection policy is "exploratory", i.e., selects actions that cause the agent to explore the environment. The action selection neural network 102 has a plurality of weights which are modified during the training. The trained weights are in effect shared between the different possible exploration importance factors (action selection policies). The action selection neural network may be implemented as a deep neural network having multiple layers.

The system 100 can use the action scores 114 to select the action 108 to be performed by the agent 104 at the time step. For example, the system 100 may process the action scores 114 to generate a probability distribution over the set of possible actions, and then select the action 108 to be performed by the agent 104 by sampling an action in accordance with the probability distribution. The system 100 may generate the probability distribution over the set of possible actions, e.g., by processing the action scores 114 using a soft-max function. As another example, the system 100 may select the action 108 to be performed by the agent 104 as the possible action that is associated with the highest action score 114. Optionally, the system 100 may select the action 108 to be performed by the agent 104 at the time step using an exploration policy, e.g., an $\epsilon$-greedy exploration policy.

In some implementations, the environment is a real-world environment and the agent is a mechanical agent interacting with the real-world environment, e.g. moving within the real-world environment (by translation and/or rotation in the environment, and/or changing its configuration) and/or modifying the real-world environment. For example, the agent may be a robot interacting with the environment, e.g., to locate an object of interest in the environment, to move an object of interest to a specified location in the environment, to physically manipulate an object of interest in the environment, or to navigate to a specified destination in the environment; or the agent may be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

For example the simulated environment may be a simulation of a robot or vehicle and the action selection network may be trained on the simulation. For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

Generally in the case of a simulated environment the observations may include simulated versions of one or more of the previously described observations or types of observations and the actions may include simulated versions of one or more of the previously described actions or types of actions.

Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

Optionally, in any of the above implementations, the observation at any given time step may include data from a previous time step that may be beneficial in characterizing the environment, e.g., the action performed at the previous time step.

The action selection neural network 102 can be implemented with any appropriate neural network architecture that enables it to perform its described function. In one example, the action selection neural network 102 may include an "embedding" sub-network, a "core" sub-network, and a "selection" sub-network. A sub-network of a neural network refers to a group of one or more neural network layers in the neural network. The embedding sub-network may be a convolutional sub-network, i.e., that includes one or more convolutional neural network layers, that is configured to process the observation for a time step. The core sub-network may be a recurrent sub-network, e.g., that includes one or more long short-term memory (LSTM) neural network layers, that is configured to process: (i) the output of the embedding sub-network, and (ii) a representation of an exploration importance factor. The selection sub-network may be configured to process the output of the core sub-network to generate action scores 114.

In some implementations, each possible exploration importance factor 112 may be defined by a scalar numerical value. However, rather than directly processing the scalar numerical value defining an exploration importance factor, the action selection neural network 102 may be configured to process an alternative representation of the exploration importance factor, e.g., as a one-hot vector.

The training system 200 may determine a reward received by the agent 104 at each time step, and may train the action selection neural network 102 using reinforcement learning techniques to optimize a cumulative measure of rewards received by the agent. The reward received by the agent may be represented, e.g., by a scalar numerical value. The training system 200 may determine the reward received by the agent at each time step based at least in part on the exploration importance factor 112 processed by the action selection neural network 102 at the time step. In particular, the value of the exploration importance factor 112 may determine the extent to which exploration of the environment 106 contributes to the reward received by the agent. In this manner, the training system 200 may train the action selection neural network 102 such that, for higher values of the exploration importance factor 112, the action selection neural network 102 selects actions that cause the agent to explore the environment more rapidly.

Figure 2:
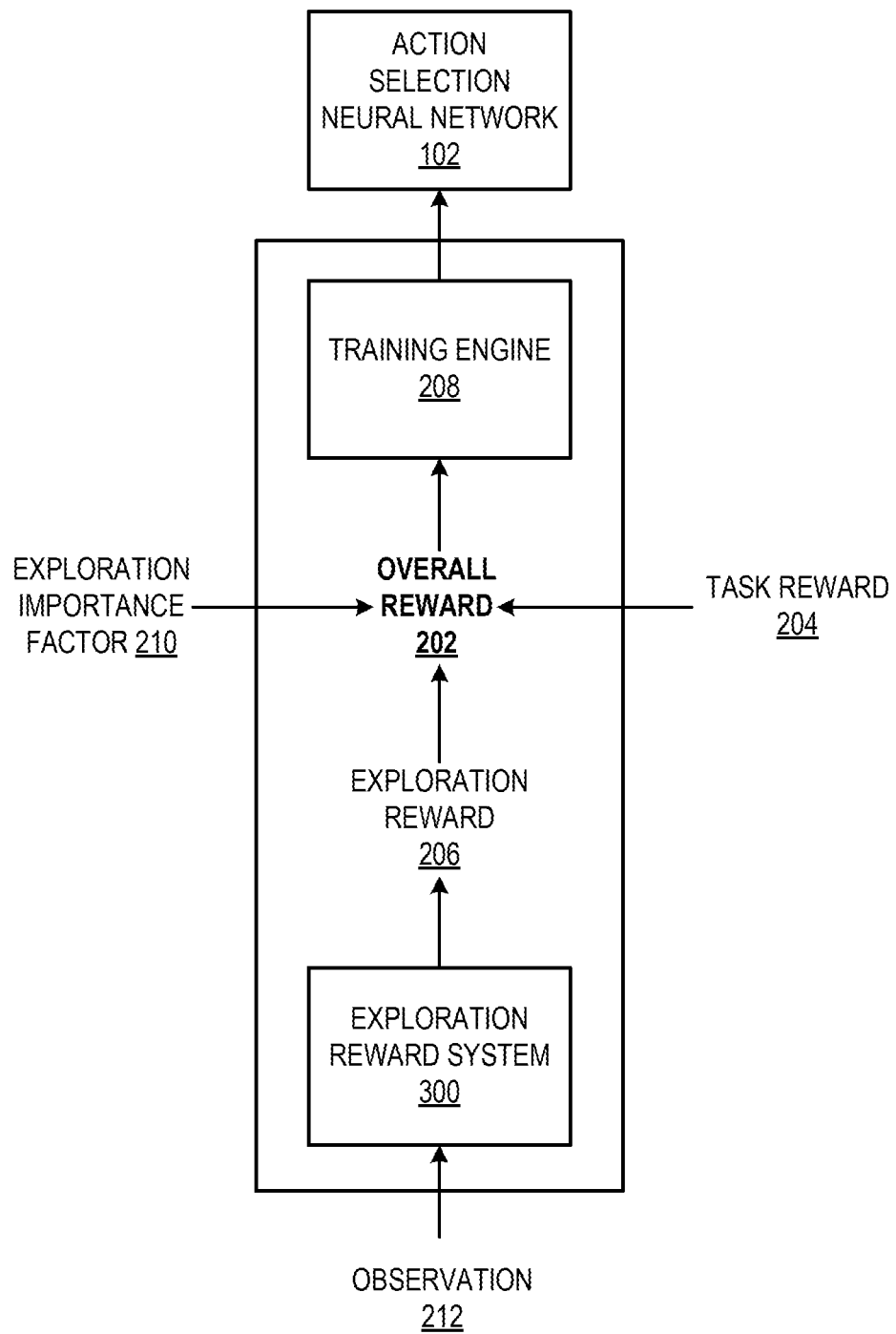
FIG. 2 shows an example training system.

FIG. 2 shows an example training system 200. The training system 200 is an example of a system implemented as computer programs on one or more computers in one or more locations in which the systems, components, and techniques described below are implemented.

The training system 200 is configured to train the action selection neural network 102 (as described with reference to FIG. 1) to optimize a cumulative measure of rewards received by an agent by performing actions that are selected using the action selection neural network 102.

The training system 200 may determine the "overall" reward 202 received by the agent at a time step based on: (i) a "task" reward 204 for the time step, (ii) an "exploration" reward 206 for the time step, and (iii) the exploration importance factor 210.

The task reward 204 for the time step may characterize a progress of the agent towards accomplishing a task in the environment at the time step. For example, the task may be for the agent to navigate to a goal location in the environment, and the task reward 204 may have a predefined positive value if the agent is within a threshold distance of the goal location, and value zero otherwise.

The exploration reward 206 may characterize a progress of the agent towards exploring the environment at the time step. For example, the training system 200 may determine the exploration reward 206 for the time step based on a similarity measure between: (i) an embedding of an observation 212 characterizing the state of the environment at the time step, and (ii) embeddings of one or more previous observations characterizing states of the environment at respective previous time steps. In particular, a lower similarity between the embedding of the observation at the time step and the embeddings of observations at previous time steps may indicate that the agent is exploring a previously unseen aspect of the environment and therefore result in a higher exploration reward 206. The training system 200 may generate the exploration reward 206 for the time step by processing the observation 212 characterizing the state of the environment at the time step using an exploration reward system 300, which will be described in more detail with reference to FIG. 3.

The training system 200 may generate the overall reward $r_t$ 202 for the time step t, e.g., as:

$$r_t = r_t^{task} + \beta \cdot r_t^{exploration} \quad (1)$$

where $r_t^{task}$ denotes the task reward 204 for the time step, $r_t^{exploration}$ denotes the exploration reward 206 for the time step, and $\beta$ denotes the exploration importance factor 210. It can be appreciated that the value of the exploration importance factor 210 controls the relative importance of the task reward 204 and the exploration reward 206 to the overall reward, e.g., such that a higher value of the exploration importance factor increases the contribution of the exploration reward to the overall reward. Other methods for determining the overall reward from the task reward, the exploration reward, and the exploration importance factor in which the value of the exploration importance factor controls the relative importance of the task reward and the exploration reward to the overall reward are possible, and equation (1) is provided for illustrative purposes only.

To train the action selection neural network 102, the training system 200 may obtain a "trajectory" characterizing interaction of the agent with the environment over one or more (successive) time steps. In particular, the trajectory may specify for each time step: (i) the observation 212 characterizing the state of the environment at the time step, and (ii) the overall reward 202 received by the agent at the time step. The trajectory may further specify the value of the exploration importance factor 210 corresponding to the trajectory, i.e., that were used to select the actions performed by the agent. A training engine 208 may thereafter train the action selection neural network 102 on the trajectory using a reinforcement learning technique. The reinforcement learning technique may be, e.g., a Q-learning technique, e.g., a Retrace double Q-learning technique, such that the action selection neural network is a Q neural network and the action scores are Q values.

The training system 200 may generate trajectories for training the action selection neural network 102 using multiple actor computing units. Each actor computing unit may be assigned a respective exploration importance factor 210, and select actions to be performed by the agent (e.g., to interact with a respective replica of the environment) using its assigned exploration importance factor. The exploration importance factor to be assigned to an actor computer unit may be selected in any of a variety of ways, e.g., the exploration importance factor may be randomly sampled from a set of possible exploration importance factors. A computing unit may be, e.g., a computer, a core within a computer having multiple cores, or other hardware or software, e.g., a dedicated thread, within a computer capable of independently perform operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a CPU while other computing units may be GPUs.

The training system 200 may store trajectories generated by each actor computing unit in a data store referred to as a replay buffer, and at each of multiple training iterations, sample a batch of trajectories from the replay buffer for use in training the action selection neural network 102. The training system 200 may sample trajectories from the replay buffer in accordance with a prioritized experience replay algorithm, e.g., by assigning a respective score to each stored trajectory, and sampling trajectories in accordance with the scores. An example prioritized experience replay algorithm is described in T. Schaul et al., "Prioritized experience replay," arXiv:1511.05952v4 (2016).

The set of possible exploration importance factors $\{\beta_i\}_{i=0}^{N-1}$ (i.e., where N is the number of possible exploration importance factors) may include a "baseline" exploration importance factor that renders the overall reward independent of the exploration reward. For example, referring to equation (1), setting the exploration importance factor $\beta=0$ renders the overall reward 202 independent of the exploration reward 206, and rather, makes the overall reward entirely dependent on the task reward.

In some implementations, the baseline exploration importance factor may be used to select actions to control the agent after training of the action selection neural network is complete. Selecting actions using the baseline exploration importance factor may cause the action selection neural network to implement an "exploitative" action selection policy, i.e., that encourages the agent to exploit its current knowledge of the environment to solve its task, without further exploration of the environment. The other possible exploration importance factors may be respective positive numbers (typically all different from each of the others), and may be considered as causing the action selection neural network to implement a respective "exploratory" action selection policy. The exploratory action selection policy, to an extent defined by the corresponding exploration importance factor, encourages the agent not only to solve its task but also to explore the environment.

The action selection neural network 102 can use the information provided by the exploratory action selection policies to learn a more effective exploitative action selection policy. The information provided by the exploratory policies may include, e.g., information stored in the shared weights of the action selection neural network. By jointly learning a range of action selection policies, the training system 200 may enable the action selection neural network 102 to learn each individual action selection policy more efficiently, e.g., over fewer training iterations. Moreover, learning the exploratory policies enables the system to continually train the action selection neural network even if the task rewards are sparse, e.g., rarely non-zero.

Figure 3:
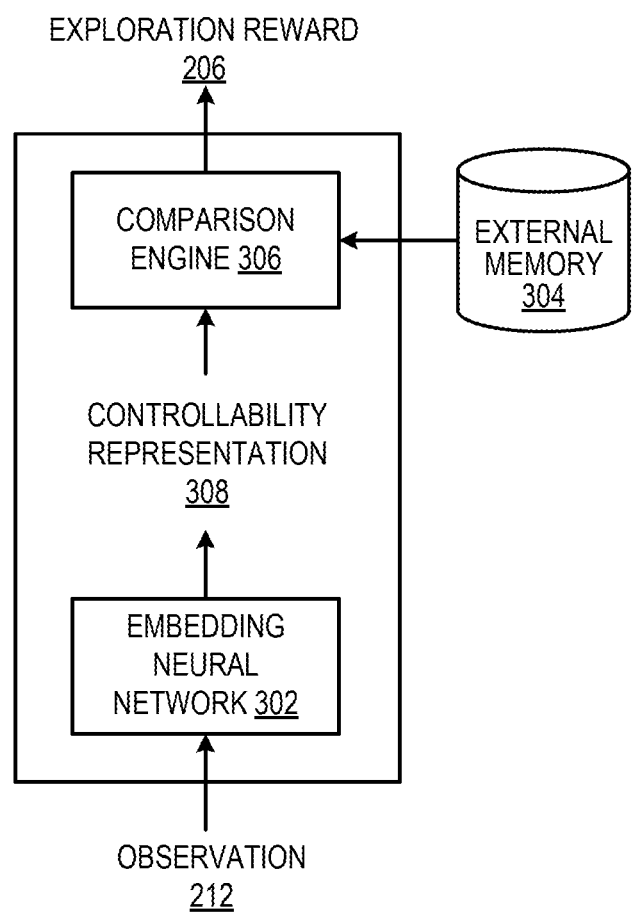
FIG. 3 shows an example exploration reward system.

FIG. 3 shows an example exploration reward system 300. The exploration reward system 300 is an example of a system implemented as computer programs on one or more computers in one or more locations in which the systems, components, and techniques described below are implemented.

The exploration reward system 300 is configured to process a current observation 212 characterizing a current state of the environment to generate an exploration reward 206 that characterizes the progress of the agent in exploring the environment. The exploration rewards 206 generated by the system 300 can be used, e.g., by the training system 200 described with reference to FIG. 2.

The system 300 includes an embedding neural network 302, an external memory 304, and a comparison engine 306, each of which will be described in more detail next.

The embedding neural network 302 is configured to process the current observation 212 to generate an embedding of the current observation, referred to as a "controllability representation" 308 (or an "embedded controllability representation"). The controllability representation 308 of the current observation 212 may be represented as an ordered collection of numerical values, e.g., an array of numerical values. The embedding neural network 302 may be implemented as a neural network having multiple layers, with one or more of the layers performing a function which is defined by weights which are modified during the training of the embedding neural network 302. In some cases, particularly when the current observation is in the form of at least one image, one or more of the layers, e.g. at least the first layer, of the embedding neural network may be implemented as a convolutional layer.

The system 300 may train the embedding neural network 302 to generate controllability representations of observations that characterize aspects of the state of the environment that are controllable by the agent. An aspect of the state of the environment may be referred to as controllable by the agent if it is (at least partially) determined by the actions performed by the agent. For example, the position of an object being gripped by an actuator of a robotic agent may be controllable by the agent, whereas the ambient lighting conditions or the movement of other agents in the environment may not be controllable by the agent. Example techniques for training the embedding neural network 302 are described in more detail below.

The external memory 304 stores controllability representations of previous observations characterizing states of the environment at previous time steps.

The comparison engine 306 is configured to generate the exploration reward 206 by comparing the controllability representation 308 of the current observation 212 to controllability representations of previous observations that are stored in the external memory 304. Generally, the comparison engine 306 may generate a higher exploration reward 206 if the controllability representation 308 of the current observation 212 is less similar to the controllability representations of previous observations that are stored in the external memory.

For example, the comparison engine 306 may generate the exploration reward $r_t$ as:

$$r_t = \left(\sqrt{\sum_{f_i \in N_k} K(f(x_t), f_i)} + c\right)^{-1} \quad (2)$$

where $N_k = \{f_i\}_{i=1}^{k}$ denotes the set of k controllability representations $f_i$ in the external memory 304 having the highest similarity (e.g., by a Euclidean similarity measure) to the controllability representation 308 of the current observation 212 (where k is a predefined positive integer value, which is typically greater than one), $f(x_t)$ denotes the controllability representation 308 of the current observation 212 denoted $x_t$, $K(.,.)$ is a "kernel" function, and c is a predefined constant value (e.g., c=0.001) that is used to encourage numerical stability. The kernel function $K(.,.)$ may be given by, e.g.:

$$K(f(x_t), f_i) = \frac{\epsilon}{\frac{d^2(f(x_t), f_i)}{d_m^2} + \epsilon} \quad (3)$$

where $d(f(x_t), f_i)$ denotes a Euclidean distance between the controllability representations $f(x_t)$ and $f_i$, $\epsilon$ denotes a predefined constant value that is used to encourage numerical stability, and $d_m^2$ denotes a running average (i.e., over multiple time steps, such as a fixed plural number of time steps) of the average squared Euclidean distance between: (i) the controllability representation of the observation at the time step, and (ii) the controllability representations of the k most similar controllability representations from the external memory. Other techniques for generating the exploration reward 206 that result in a higher exploration reward 206 if the controllability representation 308 of the current observation 212 is less similar to the controllability representations of previous observations that are stored in the external memory are possible, and equations (2)-(3) are provided for illustrative purposes only.

Determining the exploration rewards 206 based on controllability representations that characterize controllable aspects of the state of the environment may enable more effective training of the action selection neural network. For example, the state of the environment may vary independently of the actions performed by the agent, e.g., in the case of a real-world environment with variations in lighting and the presence of distractor objects. In particular, an observation characterizing the current state of the environment may differ substantially from an observation characterizing a previous state of the environment, even if the agent has performed no actions in the intervening time steps. Therefore, an agent that is trained to maximize exploration rewards determined by directly comparing observations characterizing states of the environment may not perform meaningful exploration of the environment, e.g., because the agent may receive positive exploration rewards even without performing any actions. In contrast, the system 300 generates exploration rewards that incentivize the agent to achieve meaningful exploration of controllable aspects of the environment.

In addition to using the controllability representation 308 of the current observation 212 to generate the exploration reward 206 for the current time step, the system 300 may store the controllability representation 308 of the current observation 212 in the external memory 304.

In some implementations, the external memory 304 may be an "episodic" memory, i.e., such that the system 300 "resets" the external memory (e.g., by erasing its contents) each time a memory resetting criterion is satisfied. For example, the system 300 may determine that the memory resetting criterion is satisfied at the current time step if it was last satisfied a predefined number of time steps N>1 before the current time step, or if the agent accomplishes its task at the current time step. In implementations where the external memory 304 is an episodic memory, the exploration reward 206 generated by the comparison engine 306 may be referred to as an "episodic" exploration reward. Episodic exploration rewards may encourage the agent to continually explore the environment by performing actions that cause the state of the environment to repeatedly transition into each possible state.

In addition to determining an episodic exploration reward, the system 300 may also determine a "non-episodic" exploration reward, i.e., that depends on the state of the environment at every previous time step, rather than just those time steps since the last time the episodic memory was reset. The non-episodic exploration reward may be, e.g., a random network distillation (RND) reward as described with reference to: Y. Burda et al.: "Exploration by random network distillation," arXiv:1810.12894v1 (2018). Non-episodic exploration rewards may diminish over time as the agent explores the environment and do not encourage the agent to repeatedly revisit all possible states of the environment.

Optionally, the system 300 may generate the exploration reward 206 for the current time step based on both an episodic reward and a non-episodic reward. For example, the system 300 may generate the exploration reward $R_t$ for the time step as:

$$R_t = r_t^{episodic} \cdot \min\{\operatorname{tmax}\{r_t^{non\text{-}episodic}, 1\}, L\} \tag{4}$$

where $r_t^{episodic}$ denotes the episodic reward, e.g., generated by the comparison engine 306 using an episodic external memory 304, and $r_t^{non\text{-}episodic}$ denotes the non-episodic reward, e.g., a random network distillation (RND) reward, where the value of the non-episodic reward is clipped the predefined range [1, L], where L>1.

A few example techniques for training the embedding neural network 302 are described in more detail next.

In one example, the system 300 may jointly train the embedding neural network 302 with an action prediction neural network. The action prediction neural network may be configured to receive an input including respective controllability representations (generated by the embedding neural network) of: (i) a first observation characterizing the state of the environment at a first time step, and (ii) a second observation characterizing the state of the environment at the next time step. The action prediction neural network may process the input to generate a prediction for the action performed by the agent that caused the state of the environment to transition from the first observation to the second observation. The system 300 may train the embedding neural network 302 and the action prediction neural network to optimize an objective function that measures an error between: (i) the predicted action generated by the action prediction neural network, and (ii) a "target" action that was actually performed by the agent. In particular, the system 300 may backpropagate gradients of the objective function through action prediction neural network and into the embedding neural network 302 at each of multiple training iterations. The objective function may be, e.g., a cross-entropy objective function. Training the embedding neural network in this manner encourages the controllability representations to encode information about the environment that is affected by the actions of the agent, i.e., controllable aspects of the environment.

In another example, the system 300 may jointly train the embedding neural network 302 with a state prediction neural network. The state prediction neural network may be configured to process an input including: (i) a controllability representation (generated by the embedding neural network 302) of an observation characterizing the state of the environment at a time step, and (ii) a representation of an action performed by the agent at the time step. The state prediction neural network may process the input to generate an output characterizing the predicted state of the environment at the next step, i.e., after the agent performed the action. The output may include, e.g., a predicted controllability representation characterizing the predicted state of the environment at the next time step. The system 300 may jointly train the embedding neural network 302 and the state prediction neural network to optimize an objective function that measures an error between: (i) the predicted controllability representation generated by the state prediction neural network, and (ii) a "target" controllability representation characterizing the actual state of the environment at the next time step. The "target" controllability representation may be generated by theembedding neural network based on an observation characterizing the actual state of the environment at the next time step. In particular, the system 300 may backpropagate gradients of the objective function through the state prediction neural network and into the embedding neural network 302 at each of multiple training iterations. The objective function may be, e.g., a squared-error objective function. Training the embedding neural network in this manner encourages the controllability representations to encode information about the environment that is affected by the actions of the agent, i.e., controllable aspects of the environment.

Figure 4:
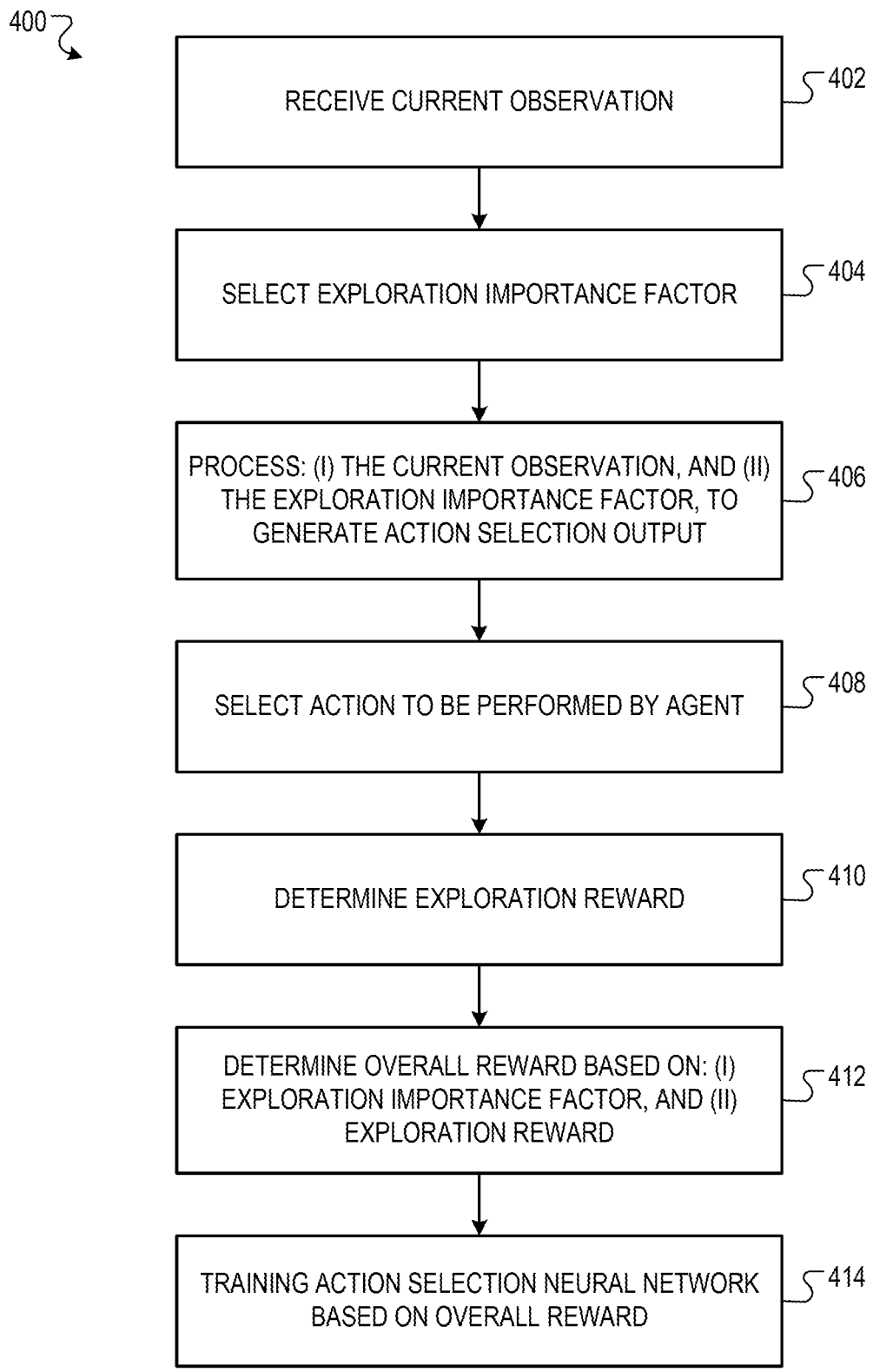
FIG. 4 is a flow diagram of an example process for training an action selection neural network that is used to select actions to be performed by an agent interacting with an environment.

FIG. 4 is a flow diagram of an example process 400 for training an action selection neural network that is used to select actions to be performed by an agent interacting with an environment. For convenience, the process 400 will be described as being performed by a system of one or more computers located in one or more locations. For example, an action selection system, e.g., the action selection system 100 of FIG. 1, appropriately programmed in accordance with this specification, can perform the process 400. The process 400 is one step of a longer training process, and may be performed repeatedly until a termination criterion is met (e.g. the agent has completed a task). Furthermore, the longer training process may itself be performed repeatedly, e.g. with different starting conditions, as part of an overall training procedure.

The system receives an observation characterizing a current state of the environment (402).

The system selects an exploration importance factor from a set of possible exploration importance factors (404). This may for example be done by any method, such as by randomly selecting the exploration importance factor from a distribution over the possible realizations of the exploration importance factor. The distribution may be constant, or may vary over during the longer training process, e.g. to gradually increase the chance that a lower value of the exploration importance factor will be selected. In another possibility, the exploration importance factor may be selected non-randomly, e.g. according to a predetermined schedule for the training procedure.

The system processes the observation and the exploration importance factor using the action selection neural network to generate an action selection output (406).

The system selects an action to be performed by the agent using the action selection output (408).

The system determines an exploration reward based on: (i) a subsequent observation characterizing a state of the environment after the agent performs the selected action and (ii) one or more previous observations characterizing states of the environment prior to the agent performing the selected action (410). An example process for determining an exploration reward is described in more detail with reference to FIG. 5.

The system determines an overall reward based on: (i) the exploration importance factor, and (ii) the exploration reward (412).

The system trains the action selection neural network using a reinforcement learning technique based on the overall reward (414).

Figure 5:
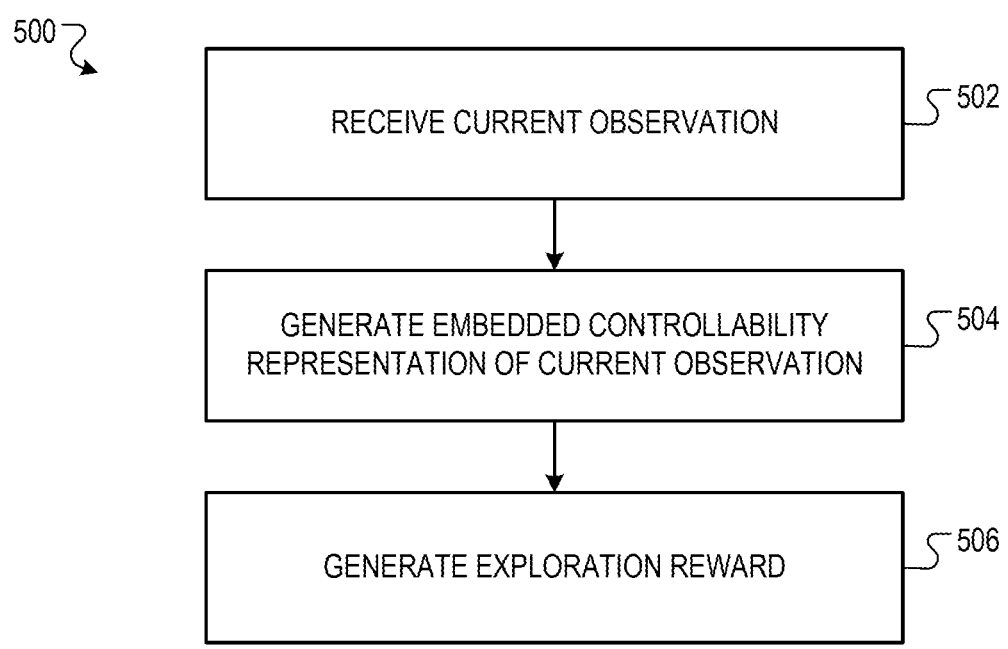
FIG. 5 is a flow diagram of an example process for generating an exploration reward for use in training an action selection neural network.

FIG. 5 is a flow diagram of an example process 500 for generating an exploration reward for use in training an action selection neural network. For convenience, the process 500 will be described as being performed by a system of one or more computers located in one or more locations. For example, an action selection system, e.g., the action selection system 100 of FIG. 1, appropriately programmed in accordance with this specification, can perform the process 500.

The system receives a current observation characterizing a current state of the environment (502).

The system processes the current observation using an embedding neural network to generate an embedded controllability representation of the current observation (504). The embedding neural network is trained to process an input observation to generate an embedded controllability representation of the input observation that characterizes aspects of the state characterized by the input observation that are controllable by the agent.

The system generates an exploration reward based on, for each of a plurality of embedded controllability representations from an external memory, a respective similarity measure between the embedded controllability representation of the current observation and the embedded controllability representation from the external memory (506). This may be done for example according to Eqn. (2) above. The external memory stores embedded controllability representations of previous observations characterizing previous states of the environment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for training an action selection neural network that is used to select actions to be performed by an agent interacting with an environment, the method comprising:
receiving an observation characterizing a current state of the environment;
selecting an exploration importance factor from a set of possible exploration importance factors;
processing the observation and the exploration importance factor using the action selection neural network to generate an action selection output;
selecting an action to be performed by the agent using the action selection output;
determining an exploration reward based on: (i) a subsequent observation characterizing a state of the environment after the agent performs the selected action and (ii) one or more prior observations characterizing states of the environment prior to the agent performing the selected action;
obtaining a task reward that characterizes a progress of the agent towards accomplishing a task after the agent performs the selected action;
determining an overall reward based on: (i) the exploration importance factor, and (ii) the exploration reward, comprising:
determining a modified exploration reward based on the exploration importance factor and the exploration reward; and
determining the overall reward based on the task reward and the modified exploration reward; and
training the action selection neural network using a reinforcement learning technique based on the overall reward.

2. The method of claim 1, wherein determining the modified exploration reward based on the exploration importance factor and the exploration reward comprises:
scaling the exploration reward by the exploration importance factor.

3. The method of claim 1, wherein determining the overall reward based on the task reward and the modified exploration reward comprises:
determining the overall reward as a sum of the task reward and the modified exploration reward.

4. The method of claim 1, wherein the set of possible exploration importance factors comprises a baseline exploration importance factor, and determining the overall reward based on the baseline exploration importance factor and the exploration reward results in the overall reward being independent of a value of the exploration reward.

5. The method of claim 4, wherein the baseline exploration importance factor has value zero.

6. The method of claim 1, wherein the reinforcement learning technique is a Retrace double Q-learning technique with prioritized experience replay.

7. The method of claim 1, wherein the set of possible exploration importance factors is a discrete set.

8. The method of claim 1, wherein determining the exploration reward comprises:
providing the subsequent observation and the prior observations to an embedding neural network, wherein the embedding neural network is configured to process an input observation to generate an embedded representation of the input observation; and
determining the exploration reward based on, for each prior observation, a similarity measure between the embedded representation of the prior observation and the embedded representation of the subsequent observation.

9. The method of claim 8, wherein the embedding neural network has been trained to process an input observation to generate an embedded representation of the input observation that characterizes aspects of the state characterized by the input observation that are controllable by the agent.

10. The method of claim 9, wherein training the embedding neural network comprises jointly training the embedding neural network with an action prediction neural network, wherein:
the action prediction neural network is configured to generate a prediction for an action that caused the state of the environment to transition from a state characterized by a given observation at a given time step to a state characterized by a subsequent observation at a subsequent time step by processing respective embedded representations of the given observation and the subsequent observation that are generated using the embedding neural network.

11. The method of claim 9, wherein training the embedding neural network comprises jointly training the embedding neural network with a state prediction neural network, wherein:
the state prediction neural network is configured to process an input comprising: (i) an embedded representation of a given observation that is generated using the embedding neural network and that characterizes the state of the environment at a given time step, and (ii) a representation of an action performed by the agent at the given time step, to generate an output characterizing a predicted subsequent state of the environment at a subsequent time step that follows the given time step.

12. The method of claim 8, wherein determining the exploration reward based on, for each prior observation, a similarity measure between the embedded representation of the prior observation and the embedded representation of the subsequent observation comprises:
determining a combined similarity measure based on the similarity measures between the embedded representation of the subsequent observation and the embedded representations of the prior observations; and
determining the exploration reward based on an inverse of the combined similarity measure.

13. The method of claim 1, wherein the agent is a robotic agent interacting with a real-world environment.

14. The method of claim 1, wherein the observation characterizing the current state of the environment comprises an image.

15. A system comprising:
one or more computers; and
one or more storage devices communicatively coupled to the one or more computers, wherein the one or more storage devices store instructions that, when executed by the one or more computers, cause the one or more computers to perform operations for training an action selection neural network that is used to select actions to be performed by an agent interacting with an environment, the operations comprising:
receiving an observation characterizing a current state of the environment;
selecting an exploration importance factor from a set of possible exploration importance factors;

processing the observation and the exploration importance factor using the action selection neural network to generate an action selection output;
selecting an action to be performed by the agent using the action selection output;
determining an exploration reward based on: (i) a subsequent observation characterizing a state of the environment after the agent performs the selected action and (ii) one or more prior observations characterizing states of the environment prior to the agent performing the selected action;
obtaining a task reward that characterizes a progress of the agent towards accomplishing a task after the agent performs the selected action;
determining an overall reward based on: (i) the exploration importance factor, and (ii) the exploration reward, comprising:
 determining a modified exploration reward based on the exploration importance factor and the exploration reward; and
 determining the overall reward based on the task reward and the modified exploration reward; and
training the action selection neural network using a reinforcement learning technique based on the overall reward.

16. The system of claim 15, wherein determining the modified exploration reward based on the exploration importance factor and the exploration reward comprises:
scaling the exploration reward by the exploration importance factor.

17. One or more non-transitory computer storage media storing instructions that when executed by one or more computers cause the one or more computers to perform operations for training an action selection neural network that is used to select actions to be performed by an agent interacting with an environment, the operations comprising:
receiving an observation characterizing a current state of the environment;
selecting an exploration importance factor from a set of possible exploration importance factors;
processing the observation and the exploration importance factor using the action selection neural network to generate an action selection output;
selecting an action to be performed by the agent using the action selection output;
determining an exploration reward based on: (i) a subsequent observation characterizing a state of the environment after the agent performs the selected action and (ii) one or more prior observations characterizing states of the environment prior to the agent performing the selected action;
obtaining a task reward that characterizes a progress of the agent towards accomplishing a task after the agent performs the selected action;
determining an overall reward based on: (i) the exploration importance factor, and (ii) the exploration reward, comprising:
 determining a modified exploration reward based on the exploration importance factor and the exploration reward; and
 determining the overall reward based on the task reward and the modified exploration reward; and
training the action selection neural network using a reinforcement learning technique based on the overall reward.

18. A method performed by one or more data processing apparatus for training an action selection neural network that is used to select actions to be performed by an agent interacting with an environment, the method comprising:
receiving an observation characterizing a current state of the environment;
selecting an exploration importance factor from a set of possible exploration importance factors;
processing the observation and the exploration importance factor using the action selection neural network to generate an action selection output;
selecting an action to be performed by the agent using the action selection output;
determining an exploration reward based on: (i) a subsequent observation characterizing a state of the environment after the agent performs the selected action and (ii) one or more prior observations characterizing states of the environment prior to the agent performing the selected action, comprising:
 providing the subsequent observation and the prior observations to an embedding neural network, wherein the embedding neural network is configured to process an input observation to generate an embedded representation of the input observation; and
 determining the exploration reward based on, for each prior observation, a similarity measure between the embedded representation of the prior observation and the embedded representation of the subsequent observation;
determining an overall reward based on: (i) the exploration importance factor, and (ii) the exploration reward; and
training the action selection neural network using a reinforcement learning technique based on the overall reward.

* * * * *